United States Patent [19]
Stringer et al.

[11] Patent Number: 6,049,386
[45] Date of Patent: Apr. 11, 2000

[54] IN-MOTION DIMENSIONING SYSTEM AND METHOD FOR CUBOIDAL OBJECTS

[75] Inventors: Bradley J. Stringer, Farmington; Lee W. Badger, Ogden, both of Utah

[73] Assignee: Quantronix, Inc., Farmington, Utah

[21] Appl. No.: 09/176,443

[22] Filed: Oct. 21, 1998

Related U.S. Application Data

[63] Continuation-in-part of application No. 08/867,730, Jun. 3, 1997, Pat. No. 5,831,737, which is a continuation of application No. 08/496,359, Jun. 29, 1995, Pat. No. 5,636,028.

[51] Int. Cl.$^7$ ................................................ G01B 11/04
[52] U.S. Cl. ........................ 356/383; 356/385; 356/379; 250/559.24
[58] Field of Search ..................... 356/372, 376, 356/379, 380, 381, 383, 385; 250/223 R, 559.24

[56] References Cited

U.S. PATENT DOCUMENTS

| | | |
|---|---|---|
| 3,682,554 | 8/1972 | Flaczynski . |
| 4,063,820 | 12/1977 | Borgese . |
| 4,751,386 | 6/1988 | Gardner . |
| 4,773,029 | 9/1988 | Claesson et al. . |
| 5,042,015 | 8/1991 | Stringer . |
| 5,105,392 | 4/1992 | Stringer et al. . |
| 5,220,536 | 6/1993 | Stringer et al. . |

FOREIGN PATENT DOCUMENTS 2 129 126   5/1984   United Kingdom .

OTHER PUBLICATIONS

Cube–in–Motion™ Carton Cubing and Weighing System brochure*.

*Primary Examiner*—Richard A. Rosenberger
*Attorney, Agent, or Firm*—Trask, Britt & Rossa

[57] ABSTRACT

An in-motion measuring system for determining the length and width of linearly-moving cuboidal objects through the use of object speed, the times during which six light beams oriented across the path of the object are obstructed by the object, and the angles of the light beams with respect to the direction of object movement. The height of an object may also be determined through use of a vertically-extending light curtain with horizontally-oriented light beams, or via an ultrasonic sensor.

27 Claims, 4 Drawing Sheets

IN-MOTION DIMENSIONING SYSTEM AND METHOD FOR CUBOIDAL OBJECTS

CROSS REFERENCE TO RELATED APPLICATIONS

This application is a continuation-in-part of application Ser. No. 08/867,730, filed Jun. 3, 1997, now U.S. Pat. No. 5,831,737, which is a continuation of application Ser. No. 08/496,359, filed Jun. 29, 1995, now U.S. Pat. No. 5,636,028, issued Jun. 3, 1997.

BACKGROUND OF THE INVENTION

1. Field of the Invention

The present invention relates generally to ascertaining the dimensions of three-dimensional objects and, more particularly, to determining the length, width and height of cuboidal objects while such objects are in constant linear motion as, for example, on a conveyor belt.

2. State of the Art

Millions of packages per year are handled and shipped by United Parcel Service, Federal Express, and many other smaller courier and delivery services as well as by the United States Postal Service. These packages originate with federal, state, and local government as well as private businesses of all sizes. In many instances, the charges by these carriers to their customers are based on the so-called "dim-weight" or "dimensional weight" (DW) of the object being shipped. DW is a fictitious dimension based on length (L) times width (W) times height (H) in inches divided by a standard agency- or association-recognized divisor or dimensional weight conversion factor, commonly 166. Thus, the DW equals L×W×H divided by 166. The "166" divisor or conversion factor has been recognized and adopted by the International Air Transport Association (I.A.T.A.). Even if an object or package is of an irregular configuration, the dim weight, using the longest measurement each of length, width, and height, is still utilized for billing purposes. The volume computed by multiplication of object length times width times height may hereinafter be termed the "cubic volume", "spatial volume", or simply the "cube" of the object.

The measurements of the objects shipped are also critical so that the carrier can accurately determine the number of trucks, trailers, or other vehicles which will be required to transport goods to their destinations and so customers and carriers can accurately estimate their warehousing and other storage needs.

In addition, article weight and measurements are also used to determine and predict weight and balance for transport vehicles and aircraft and to dictate the loading sequence for objects by weight and dimensions for maximum safety and efficiency.

Further, if orders of any items are to be packed into boxes, knowledge of object weight and dimensions are useful for selecting box size and durability.

The assignee of the present invention has been instrumental in developing quick, accurate means and methods for determining the dimensions and the cubic volume or spatial volume for packages and other objects in a commercial or industrial setting. For example, U.S. Pat. No. 5,042,015, assigned to the assignee of the present invention, discloses a practical and commercially successful means and method for object measuring. However, the patented method and apparatus requires, for measurement of moving cuboidal objects, that the sides of the objects be aligned parallel and perpendicular to the path of movement. Thus, there existed a need for a system for measurement of skewed cuboidal objects.

One such system for measurement of the dimensions of skewed objects (of any shape) is described in U.S. Pat. No. 4,773,029. The system of the '029 patent, however, senses the apparent dimension of the moving object solely through use of infrared emitter-receiver rays, and establishes the true length and width of an object by periodic measurements which provide "slices" of the object, the slices then being summed to provide a horizontally planar footprint of the object from which the true length and width are determined. The inventors have no specific knowledge as to whether a commercial embodiment of this system in fact works as described in the patent, but the system's advertised cost makes it prohibitively expensive, beyond the capabilities of many businesses, and a financial burden on those few companies able to afford it.

U.S. Pat. No. 5,105,392, assigned to the assignee of the present invention, provides an alternative to the system of the '029 patent for measuring skewed cuboidal objects. The '392 patent discloses and claims a method and an apparatus for determining the actual length and width dimensions of a linearly moving object with a rectangular footprint by determining apparent length, apparent width, and the distance between an object corner facing to the side of the travel direction and the trailing edge of the object. These measurements are then employed to determine the actual object length and width by trigonometrically-based mathematical equations. The methodology described in the '392 patent has been proven to be sound, as have the mathematical relationships, but the apparatus as described in the application employed to obtain the dimensions has been found lacking as to the accuracy desired by the assignee.

Yet another patent, U.S. Pat. No. 5,220,536, also assigned to the assignee of the present invention, employs a different, light-curtain-based apparatus to determine the length and width of a skewed cuboidal object and employs the mathematical relationships previously developed for the '392 patent.

Another light curtain-based, in-motion dimensioning measuring system is also offered commercially by the assignee of the present invention as the CubiScan® 200.

One problem common to all of the commercially offered, in-motion dimensioning measuring systems on the market is the necessity for a gap or "break" in the conveyor system on which the objects to be measured are moving. Thus, all of the state of the art systems for in-motion measuring of objects, cuboidal or otherwise, require a more or less custom installation and must be installed in conjunction with a new conveyor system, or at least a segment of an existing conveyor system must be scrapped and a new system or portion with the requisite "break" installed. A further disadvantage of all commercially offered, in-motion dimensioning systems is their high cost and the already-alluded-to difficulty of installation, particularly in existing warehouse, shipping, or other storage facilities which are not initially designed to accommodate these systems and in which space may be at a premium. Thus, there is a need for an accurate, relatively inexpensive, easily installed dimensioning system which can be integrated not only with newly-installed conveyor systems, but can be integrated with the majority, if not all, existing, constant-speed belt or roller type conveyor systems.

The inventors have recognized that well in excess of 90% of all packages and other objects which are commercially shipped in the course of normal business and industry are in fact cuboidal in shape, that is to say, that such objects have a parallel top and bottom and two pairs of mutually parallel sides, each pair of sides being at a 90° angle to the other pair and all of the sides being at a 90° angle to the top and bottom of the object (i.e., they form a parallelpiped). This regular and predictable configuration, therefore, is susceptible to a relatively simple and inexpensive means and method developed by the inventors for measuring length and width while the object is moving linearly at a substantially constant rate. The height of the object may be determined by any one of a number of approaches, including reflective ultrasound or the use of a light curtain.

BRIEF SUMMARY OF THE INVENTION

The present invention employs a system of light beams oriented to cross the path of an object moving linearly at a known rate, so that the time the object blocks the passage of each light beam between an emitter and a receiver can be used to determine the length and width dimensions of the object. The invention is specifically adapted to measure the length and width of cuboidal objects, as previously defined.

The apparatus of the present invention employs two pairs of, or a total of four, light beams which are aimed across the path of a cuboidal object moving linearly and at a constant speed, such object typically being carried by a belt-type or roller-type conveyor as well-known in the art. There are a number of possible configurations or arrangements for the light beam paths, but one is most preferred currently as permitting the apparatus to be relatively compact.

This preferred arrangement may be termed a "double X", wherein four emitters are placed at one side of a linear conveyor and are aimed across the conveyor, which carries the object, toward cooperating receivers aimed to receive the light beams. Two of the emitters are placed relatively close together and at an angle of 67.5° to the longitudinal path of the conveyor means, and opposite or facing in orientation so that the first and second light beams cross to form an "X" at the center of the conveyor path. Two cooperating receivers are oriented at the same angle as the two emitters and are spaced at the same longitudinal locations and thus at the same relative mutual longitudinal distance as the two emitters, but on the opposite side of the conveyor belt. There are two additional facing emitters more widely spaced at the same side of the conveyor as the first two emitters, and oriented at an angle of 22.5° to the longitudinal path of the conveyor. Two additional receivers are placed on the opposite side of the conveyor from and in alignment with the latter two emitters and similarly angled at 22.5° to the conveyor path to receive the emitted light beams. The two light beams from the widely-spaced emitters cross at substantially the same point on the conveyor path as the first two light beams from the closely-spaced emitters, the third and fourth light beams forming a second "X". It is also possible to separate the two "X's" so that all of the beams do not intersect at a single point, or even to space each of the beams so that none intersect whatsoever; however, such arrangements spread out the apparatus along the conveyor and thus are not as convenient or compact for installation.

Another, although less preferred, arrangement of the emitter/receiver pairs considered to be practicable within a reasonable amount of longitudinal space can be termed a "double V" configuration, wherein there are two closely-spaced emitters at the aforementioned 67.5° angle to the path of the conveyor and two widely-spaced emitters at the aforementioned 22.5° angle. However, unlike the first embodiment, all of the emitters are aimed at receivers placed at a single point on the opposite side of the conveyor. While the second embodiment may simplify installation in some circumstances due to the common location for all four receivers, the fact that the light beams do not cross but rather converge on a single point on the opposite side of the conveyor from the emitters of necessity renders the apparatus much longer than if a crossed-beam arrangement as in the first embodiment were employed.

Other arrangements of emitters and receivers are possible, the foregoing being merely convenient examples which are believed to represent the best mode of practicing the present invention at this time. For example, it is not required that all of the emitters be placed on one side of the conveyor and all of the receivers on the other.

The basic design parameters of the invention are that a first light beam be orthogonal (at a right angle) to a second light beam in a light beam pair, that the other two paired light beams be similarly orthogonal and that the two light beam systems or pairs be rotationally skewed or offset by a 45° angle about a vertical axis.

The dimensions of a linearly-moving object with a rectangular footprint are determined by first computing the distance the object moves along the conveyor while obstructing each of the four light beams, this being a function of the rate of movement multiplied by the time the object is "in" or obstructing the beam. The projection of the object on an axis orthogonal to each beam is then computed trigonometrically, using the cosine of the angle of the beam to a line normal to the direction of the conveyor path. Four possible diagonals for the object are then computed using the projections, and the two identical (or closest in value) diagonals are selected as representative of a rectangle. Using the projection values associated with these two diagonals, the length and width of the object are then easily computed.

Yet another embodiment of the invention utilizes three orthogonal pairs of light beams to determine length and width of a cuboidal object. The second pair of light beams is rotated counter-clockwise about a vertical axis a positive angle with respect to the first pair, while a third pair of light beams is rotated counter-clockwise about the vertical axis with respect to the first pair a positive angle different than that about which the second pair is rotated. The first and second beam pairs are employed in the same manner as described above with respect to the four-beam embodiments of the invention to find the dimensions of all non-square objects passing through the light beams, while the first and third pair in combination are employed to confirm the true dimensions of square objects passing through the light beams. Use of six light beams permits much closer spacing of objects on a conveyor, and thus greater throughput for a given conveyor speed, than the four light beam embodiments.

DETAILED DESCRIPTION OF THE INVENTION

Figure 1:
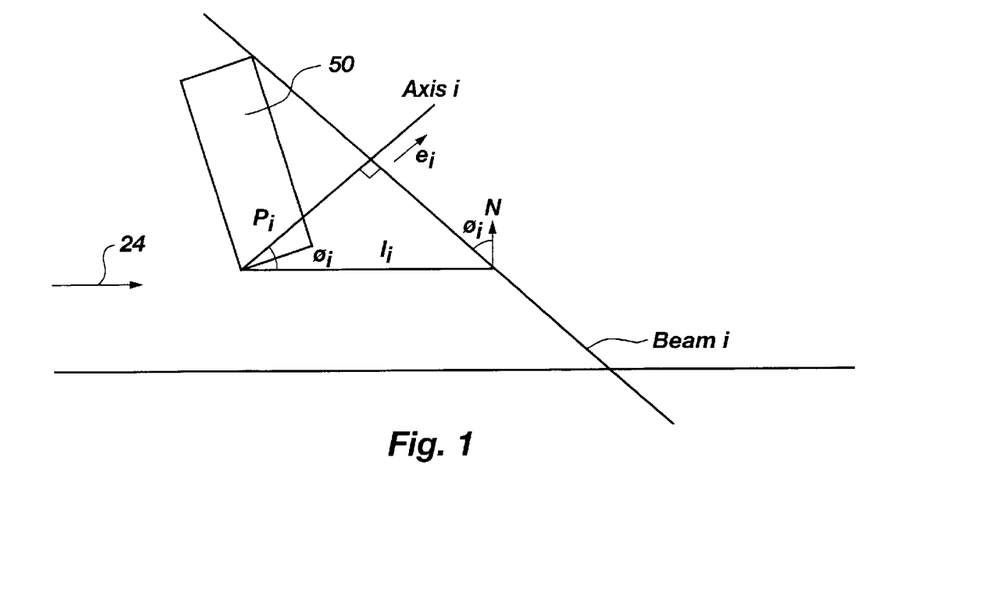
FIG. 1 is a schematic representation of the relationship between object travel through a single light beam, the linear distance moved by the object while obstructing the beam, and the projection of the object on an axis orthogonal to the light beam corresponding to the distance of movement for a given angle of light beam to a line normal to the direction of movement.

Referring now to FIG. 1 of the drawings, an exemplary rectangular object 50 is shown moving linearly in direction 24 at a constant rate. If $l_i$ is the distance the object travels in beam i and $\phi_i$ is the acute angle between light beam i and a normal to the direction 24 of motion, then $p_i$, the projection of the object on axis $e_i$, orthogonal to beam i, is given by $p_i = l_i \cos(\phi_i)$.

Since there are four light beams employed in the present invention and thus four axes $e_i$, there are four projections $p_i$ and four possible diagonals D for an object which is rectangular in the horizontal plane. If unit vectors for the four axes are:

$$e_1 = \langle 1, 0 \rangle, e_2 = \langle 0, 1 \rangle, e_3 = \left\langle \frac{1}{\sqrt{2}}, -\frac{1}{\sqrt{2}} \right\rangle, e_4 = \left\langle \frac{1}{\sqrt{2}}, \frac{1}{\sqrt{2}} \right\rangle$$

Let the projections be respectively $p_1$, $p_2$, $p_3$, $p_4$. The four diagonals are determined by the four pairs of projections on the four pairs of non-orthogonal axes. Let $D_{13} = \langle x, y \rangle$ be the diagonal determined by $p_1$ and $p_3$.

$$\text{So } \langle x, y \rangle \cdot e_i = \pm p_i$$

$$\begin{cases} x = \pm p_1 \\ \frac{1}{\sqrt{2}} x - \frac{1}{\sqrt{2}} y = \pm p_3 \end{cases}$$

The solution to the system with $-p_1$ and $-p_3$ is the opposite vector to that with $+p_1$ and $+p_3$ and represents the same diagonal so one can discard it. Similarly, $-p_1$, $+p_3$ is discarded in favor of $+p_1$, $-p_3$.

$$\begin{cases} x = p_1 \\ \frac{1}{\sqrt{2}} x - \frac{1}{\sqrt{2}} y = p_3 \end{cases} \Rightarrow \langle p_1, p_1 - \sqrt{2} p_3 \rangle$$

$$\begin{cases} x = p_1 \\ \frac{1}{\sqrt{2}} x - \frac{1}{\sqrt{2}} y = -p_3 \end{cases} \Rightarrow \langle p_1, p_1 + \sqrt{2} p_3 \rangle$$

It can be shown mathematically that the shorter of the two vectors is the diagonal, and $\langle p_1, p_1 - \sqrt{2} p_2 \rangle$ is shorter, so $D_{13} = \langle p_1, p_1 - \sqrt{2} p_3 \rangle$.

A similar analysis gives:

$D_{23} = \langle p_2 - \sqrt{2} p_3, p_2 \rangle$ $D_{14} = \langle p_1, -p_1 + \sqrt{2} p_4 \rangle$ $D_{24} = \langle -p_2 + \sqrt{2} p_4, p_2 \rangle$ The alternate pairs of diagonals are $D_{13}, D_{24}$ and $D_{14}, D_{23}$.

So if $p_1, p_2, p_3, p_4$ are the projections of a rectangle, either $\|D_{13}\| = \|D_{24}\|$ or $\|D_{14}\| = \|D_{23}\|$. The equal pair $D_1, D_2$ is the diagonal of the rectangle. It can be shown mathematically that, unless the true rectangle is a square, the other pair of diagonals is of different lengths. If the rectangle is a square, all four diagonals are the same length. In actual application, there will be at least a small measurement error and numerical error, so one does not expect true equality. Instead $D_1$ and $D_2$ are set to the pair whose magnitudes differ least. The length of the rectangle is the larger of $\frac{1}{2}\|D_1 + D_2\|$ and $\frac{1}{2}\|D_1 - D_2\|$. The width is the smaller of the two.

It has been ascertained that if the two pairs of orthogonal axes $e_i$ are oriented at 45° to each other and the rectangular object in question is square, two possible squares defined by the above algorithm are congruent, and thus the length of the side of the square can be determined with certainty. Further, to employ the algorithm previously described, the axes must be numbered so that their normals have the same relative orientations as $e_1, e_2, e_3, e_4$.

Figure 2:
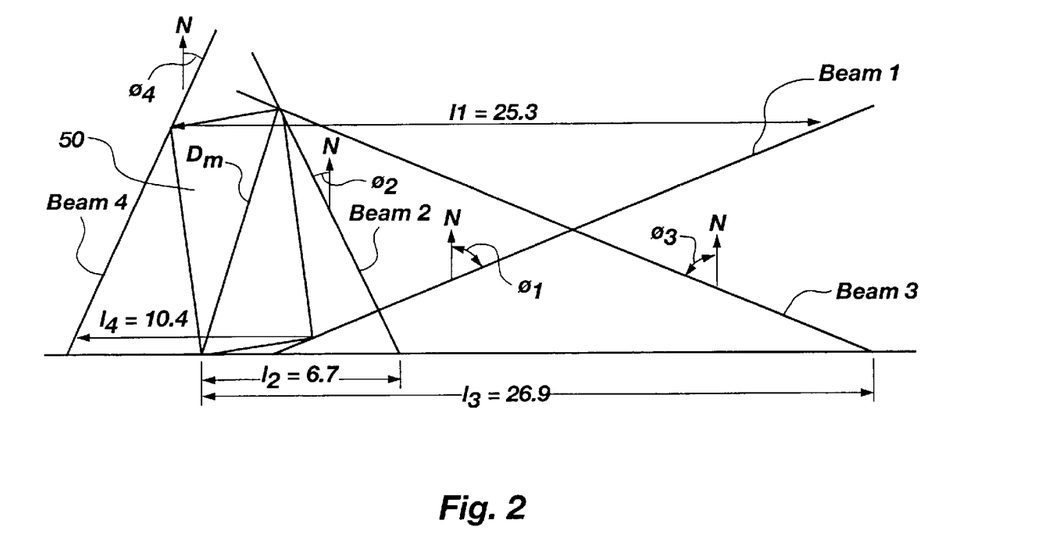
FIG. 2 is a schematic employed in an illustrative numerical example for computing the length and width of a cuboidal object.

Referring to FIG. 2 of the drawings, the following numerical example is illustrative of the methodology of the present invention, all dimensions being in inches:

$l_1 = 25.3 \quad \phi_1 = -67.5° \quad p_1 = 9.68$
$l_2 = 6.7 \quad \phi_2 = 22.5° \quad p_2 = 6.19$
$l_3 = 26.9 \quad \phi_3 = 67.5° \quad p_3 = 10.29$
$l_4 = 10.4 \quad \phi_4 = -22.5° \quad p_4 = 9.61$ $D_{13} = \langle 9.68, -4.87 \rangle, \|D_{13}\| = 10.84$
$D_{14} = \langle 9.68, 3.91 \rangle, \|D_{14}\| = 10.44$
$D_{23} = \langle -8.36, 6.19 \rangle, \|D_{23}\| = 10.40$
$D_{24} = \langle 7.40, 6.19 \rangle, \|D_{24}\| = 9.65$ $D_{14}$ and $D_{23}$ are closest, and also agree well with a measured diagonal $D_m$ of 10.5 of an object 50.

Figure 3:
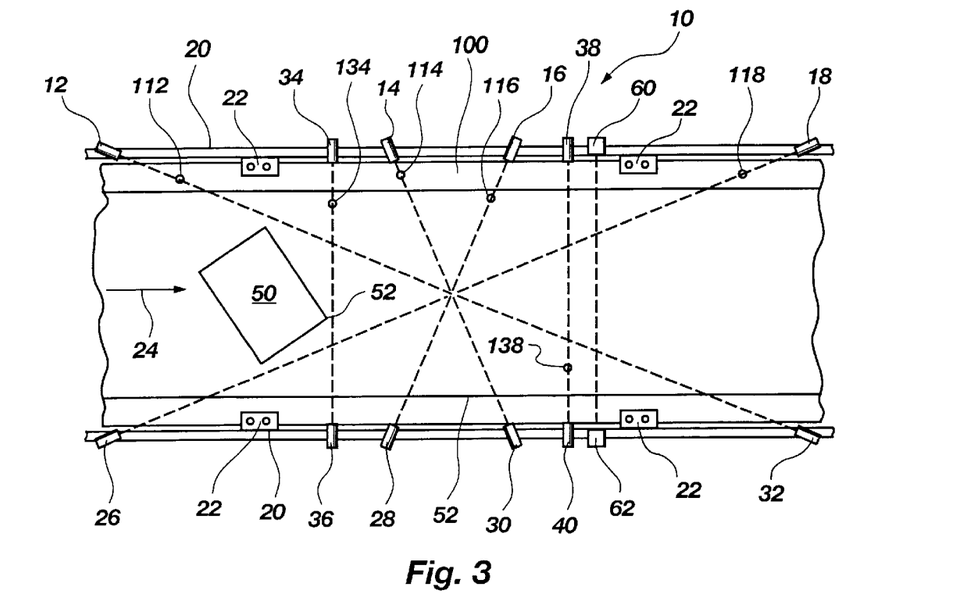
FIG. 3 is a top elevation illustrating a preferred "double X" sensor arrangement for the apparatus of the present invention.

$D_1 = \langle 9.68, 3.91 \rangle \qquad D_2 = \langle -8.36, 6.19 \rangle$
$D_1 + D_2 = \langle 1.32, 10.1 \rangle \quad D_1 - D_2 = \langle 18.04, -2.28 \rangle$ $\frac{1}{2}\|D_1 + D_2\| = 0.5 \times 10.19 = 5.09$ $\frac{1}{2}\|D_1 - D_2\| = 0.5 \times 18.18 = 9.09$ So Computed length = 9.09  9.2 = Measured length
Computed width = 5.09  4.8 = Measured width Referring now to FIG. 3 of the drawings, an exemplary apparatus 10 of the present invention is schematically depicted as installed on a belt-type conveyor 100. Four light beam emitters 12, 14, 16 and 18 comprising infrared light emitting diodes, or LED's, are mounted on support 20, which is secured to conveyor 100 via clamping or bolting of flanges 22 thereto, or is otherwise rendered stationary with respect to conveyor 100. Emitters 12 and 18 are oriented at 22.5° angles to the linear direction of motion 24 of conveyor 100 (normals to their light beams being at 67.5° to the direction of motion 24), while emitters 14 and 16 are oriented at 67.5° angles to the direction of motion (normals to their light beams being at 22.5° to the direction of motion). Emitters 12 and 14 are opposite in orientation to, and facing, emitters 16 and 18 at the aforementioned angles to the direction of motion 24. Light beam receivers 26, 28, 30 and 32 are placed on the opposite side of conveyor 100 from the emitters on a similar support 20 affixed via flanges 22 to conveyor 100. Receivers 26 and 32 are placed, respectively, opposite emitters 12 and 18, and at identical angles to direction of motion 24 as their cooperating emitters 12 and 18. Receiver 32 receives a light beam from emitter 12, and receiver 26 receives a light beam from emitter 18. Receivers 28 and 30 are placed, respectively, opposite emitters 14 and 18, and at identical angles to direction of motion 24 as their cooperating emitters 14 and 16. Receiver 28 receives a light beam from emitter 16, while receiver 30 receives a light beam from emitter 14. Since the light beams are constant, no external trigger mechanism is required to commence the timing and measuring sequence effected by the beams.

Timing sensors such as light beam emitter/receiver pairs 34 and 36 and 38 and 40 may be aimed across conveyor 100 and perpendicular to the direction of motion 24 to time the passage of an object over the known distance between the timing sensor pairs through sequential interruption of light beams 134 and 138 by the leading edge 52 of the object 50, and thus determine the speed of the object 50. Alternatively, a contact wheel on the conveyor belt, or a rotary encoder associated with the conveyor drive, as also known in the art, may be employed to measure conveyor, and thus object, speed.

Cuboidal object 50 may be placed in any orientation on conveyor 100, so that its passage obstructs the four light beams 112, 114, 116 and 118 emitted, respectively, by emitters 12, 14, 16 and 18. In accordance with the present invention, light beam 112 is orthogonal to and paired with light beam 116, while light beam 114 is orthogonal to and paired with light beam 118. The 112/116 beam pair is rotated 45° about a vertical axis with respect to the 114/118 beam pair. As noted above, the four distancesy $l_1$, $l_2$, $l_3$ and $l_4$ the object travels while obstructing each of the respective light beams is, in combination with the rate of object travel, the basis for ascertaining the length L and width W of object 50. It should be noted that the system of the present invention, in the embodiment described above, does not require any calibration to a target object, since conveyor speed measurement in combination with time of interruption of each of the four light beams avoids the need for any such reference.

While a reflector-type photocell system may, in theory, be usable for the light beam aspects of the present invention, the varied orientation angles of the objects being measured, in combination with the differences in reflectivity of their surfaces, renders such an approach undesirable from a practical standpoint. Thus, use of through-beam photocells, with paired infrared emitters and receivers, is the preferred approach. Such photocell pairs are commercially available as Model No. WS/WE 6 from SICK Optic-Electronic, Inc. of Eden Prairie, Minn. The same type of paired emitters and receivers may be employed, for the sake of simplicity, for both the four light beam object projection sensors and the timing sensor pairs.

The receivers of each emitter/receiver pair operate on a high/low output, depending upon whether the light beam from the emitter is blocked. For the sake of example only, a blocked beam may produce a high voltage output signal (5V), while an open or through-beam may produce a low (0V) signal. An inverter (see FIG. 5), as known in the art, is used to convert the 5/0 volt high/low signals to be TTL-function compatible for the gate circuits employed. It is desirable that the receivers have very short transition times from light to dark and dark to light, transition time being defined as the time between breaking of a light beam and the resulting voltage spike at the receiver or restoration of the through-beam and resulting maximum voltage drop. An exemplary preferred transition time would be less than one millisecond (<1 ms).

For enhanced accuracy and reduced interference from ambient light sources, it is desirable to provide both emitters and receivers with vertical slit-type filters, preferably of 2 mm aperture width. This maximizes the spatial sensitivity of the emitter/receiver pairs, and prevents light from other sources from producing false readings. It has been found that a filter on both emitters and receivers is desirable. In order to eliminate interference between light beams, beams which cross may be spaced at different vertical levels, or emitter/receiver pairs with differing wavelengths or filtered at different wavelengths may be employed. It is also desirable that the light beams be co-planar or lie in parallel planes which are also parallel to the surface of the conveyor 100 so that trigonometric corrections for angles of the light beam plane (s) with respect to the conveyor plane are not required.

Figure 4:
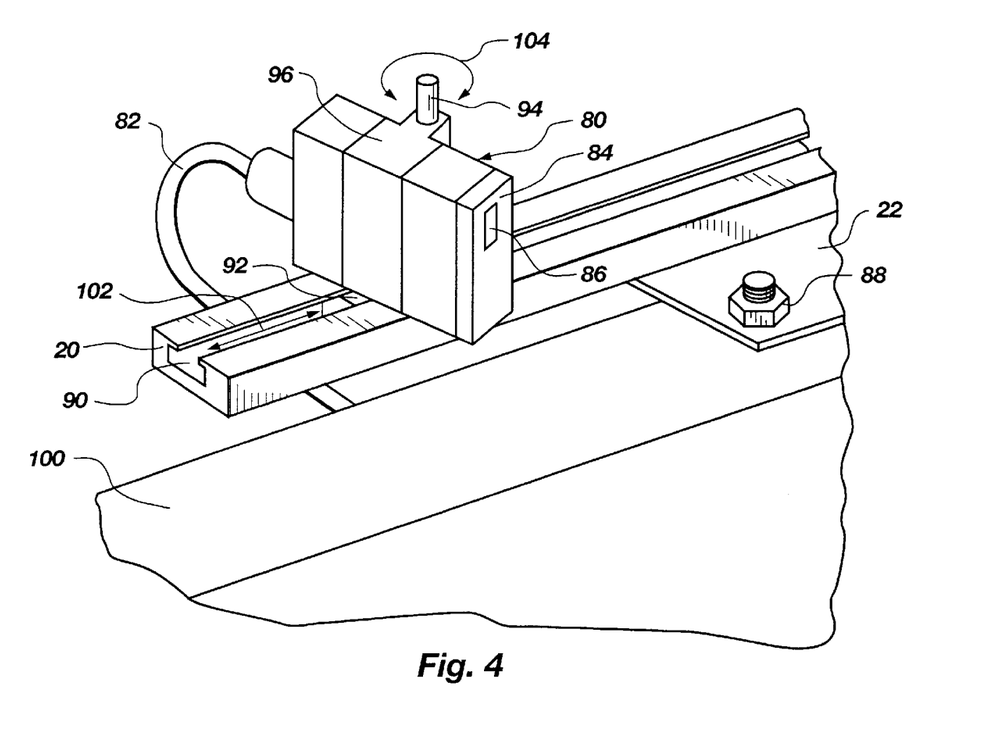
FIG. 4 is a perspective of a light beam sensor component mounted on a supporting structure at the side of a belt-type conveyor in a manner permitting longitudinal and rotational alignment of the sensor to accommodate different conveyor widths.

FIG. 4 depicts an exemplary sensor component 80, which may correspond to any one of emitters 12–18 or receivers 26–32, or an emitter or receiver used in a timing application. Sensor component 80 receives its supply voltage and sends its output through conductors of a standard cable 82 to processing circuitry. Component 80 is also equipped with a mask 84 defining a vertical slit 86 for passage of a light beam, and optionally including a filter to block out certain wavelengths. Component 80 is shown mounted on support 20, which is affixed to conveyor system 100 via flange 22 which is bolted as at 88 to the frame of conveyor 100. Support 20 may have a slot 90 formed therein, in which slides a key 92 having a rod 94 vertically extending therefrom, on which component 80 is mounted via sensor caddy 96. Thus, as shown by arrows 102 and 104, a sensor component may be moved longitudinally along conveyor 100 and rotated to the proper angular orientation. Longitudinal adjustment is important to accommodate differing conveyor widths, while rotational adjustment ability offers precise angular adjustment during installation. It is also notable that the use of rod 94 permits vertical adjustment so that the light beams are both horizontally and vertically alignable to an optimum extent. While not shown, it will be appreciated that means known in the art, such as set screws, c-clamps, lock nuts, and other mechanisms, may be used to secure a component 80 in its final, desired location and orientation. In furtherance of ease of transport of an apparatus of the invention to its installation site, it is also contemplated that supports 20 may be segmented and hinged or telescopically arranged to reduce the length of the assembly for shipping. If the width of the conveyor is known, the sensor components may be pre-placed at the factory, with only fine-tuning necessary at the job site. Installation involves only mounting the supports 20 (which may also be floor-mounted, if desired) and hooking sensor cables to the processing circuitry, which may be stand-alone or comprise a card inserted in a PC.

The accuracy of the sensor system is dependent not only on the short transition times and accurate sensing of the receivers but also on the accuracy of the time measurement of each of the four "dark" time intervals measured for each object. Thus, use of a high speed clock is very desirable, the speed in counts/second being ideally adjustable from a low of 10,000 per second to 1,000,000 per second, the required clock speed for a given dimensional measurement being related to conveyor speed.

Figure 5:
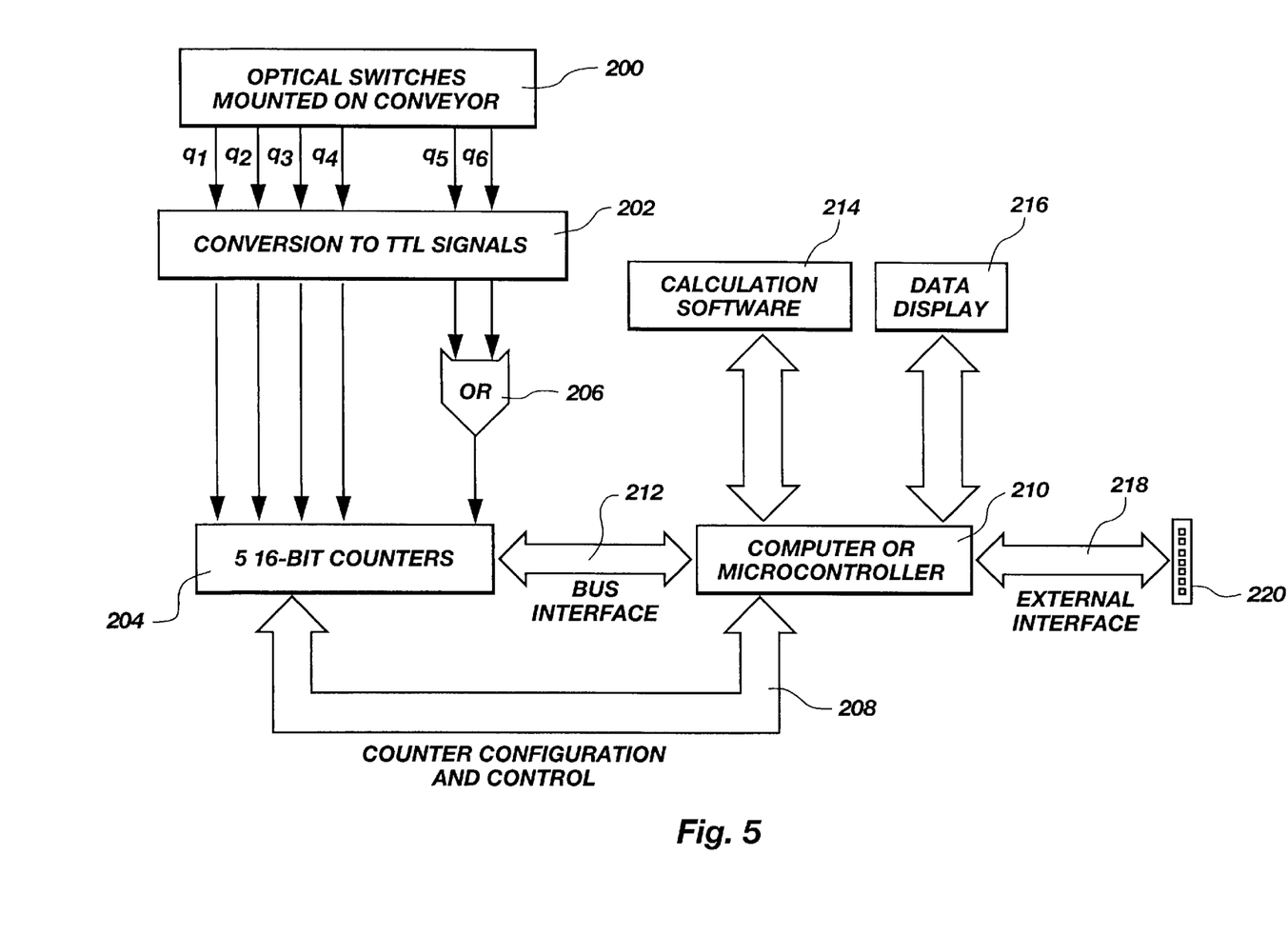
FIG. 5 is a sensor component and circuit macro-level schematic of a preferred embodiment of the present invention.

A schematic of the sensing and processing circuitry for a preferred embodiment of the present invention is shown at FIG. 5. In FIG. 5, optical switches generally indicated at 200 and referenced as $q_1$, $q_2$, $q_3$ and $q_4$ may correspond, respectively, to emitter and receiver pairs 18, 26 and 14, 30 and 12, 32 and 16, 28 of FIG. 3. Optical switches $q_5$ and $q_6$ correspond to emitter and receiver pairs 34, 36 and 38, 40. Conversion to TTL signals 202 is effected by an inverter, as previously referenced. The signals from optical switches $q_1$–$q_4$ generated during the time said light beam is broken are counted by four of the five 16-bit counters in counter array 204. The $q_5$ and $q_6$ signals are transmitted through OR gate 206 to the remaining 16-bit counter, the signal from $q_5$ starting the counter and the signal from $q_6$ stopping it, as the leading edge 52 of object 50 encounters the two light beams in sequence.

Counter configuration and control 208 includes a clock. Counter array 204 interfaces with computer or microcontroller 210 via bus interface 212. Computer or microcontroller 210 controls counter array 204 through counter configuration and control 208. Calculation software 214 is employed by computer or microcontroller 210 to mathematically determine the length and width of the cuboidal object as set forth above, and the results (and raw data, if desired) displayed to the operator via data display 216, which may comprise a PC monitor or other video display device such as in LED numerical readout.

Computer or microcontroller 210 can interface with an external device such as a host computer via external interface 218, which may comprise a card to be inserted in a host PC, the connection thereto being indicated by connector 220. As shown, a controller with a display would be employed for legal-for-trade applications.

While not previously discussed in any detail, it is, of course, desirable if not absolutely necessary for some applications to measure the height of the object 50 as well as its length and width. Several suitable systems are available, but the preferred system is a light curtain system such as the BEAM-ARRAY™ system offered by Banner Engineering Corporation of Minneapolis, Minn. As shown in FIG. 3, a suitable length Model No. BME148A emitter 60 is vertically deployed above the conveyor surface in alignment with a similar length BMR148A receiver 62 placed across conveyor 100. Emitter 60 employs infrared light emitting diodes (LED's) on 0.25 inch centers, and receiver 62 employs phototransistors centered on the same intervals. The LED's are fired sequentially along the length of emitter 60 at a rate of four milliseconds per foot of emitter length. Each emitted infrared beam is directed to its correspondingly aligned phototransistor in receiver 62. The number of light beams broken between emitter 60 and receiver 62 above the conveyor surface indicates the height of object 50.

Alternatively, a support carrying a downward-firing ultrasonic sensor may be placed over the conveyor, and the height of the object determined from travel time of an ultrasonic wave reflected therefrom, in the manner disclosed in the aforementioned U.S. Pat. No. 5,042,015.

For object identification, a bar code reader such as is known in the art may be used to read and identify each bar-coded object as it is placed on the conveyor, or as it is removed from the conveyor. It is anticipated, if the bar code is on the top or a side surface of the object, that such reading may be automated with a reader placed over the conveyor, in combination with the measuring apparatus of the present invention and as a component thereof.

Figure 6:
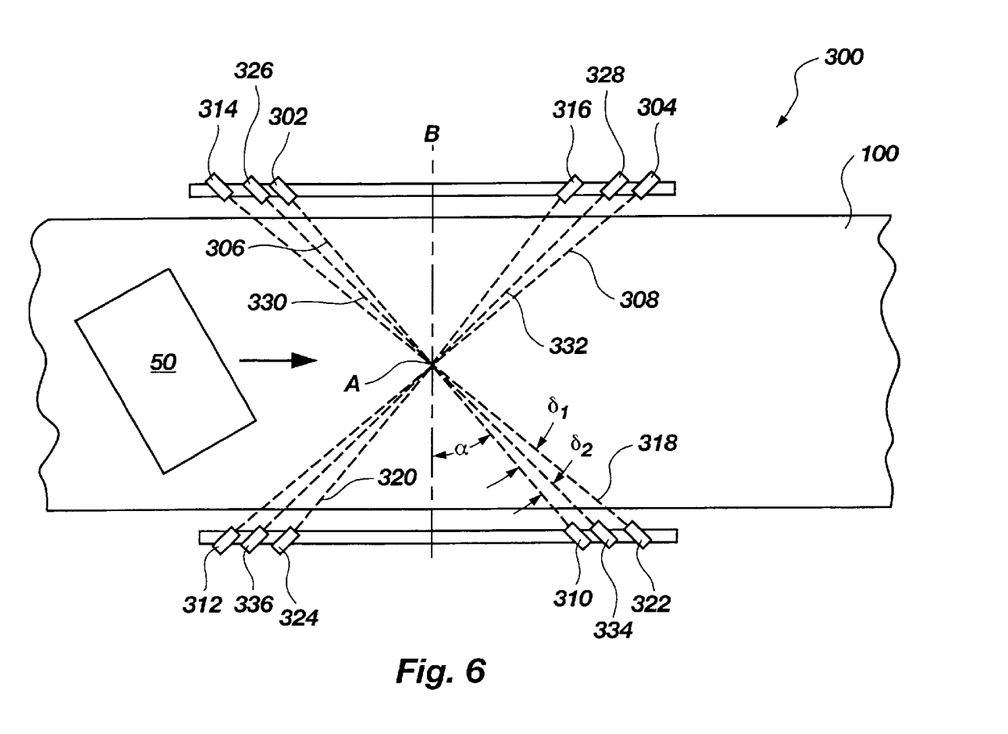
FIG. 6 is a top schematic elevation of a preferred sensor arrangement for a six light beam embodiment of the present invention.

Referring now to FIG. 6 of the drawings, a further embodiment 300 of the invention employing an arrangement of six light beam emitters and associated receivers or sensors will be described. The preferred emitter and sensor arrangement employs three pairs of emitters, each having an associated sensor, with each pair of emitters oriented to emit mutually orthogonal light beams. Preferably for compactness, although this is not a requirement, the three pairs of light beams emitted are oriented to cross at a common point along the path of an object being measured, such as a center point in the width of a conveyor. Also preferable for convenience, although not required, is that all of the emitters be arranged along one side of the object path, and all the sensors be arranged along the opposing side of the object path.

The first pair of light beam emitters 302 and 304 is oriented to emit mutually orthogonal light beams 306 and 308 across the path of an object 50 moving linearly, for example, on a belt-type conveyor 100 to be respectively received by receivers 310 and 312. The first pair of beam emitters 302 and 304 is preferably placed so that one of the light beams, 306 or 308, is rotated counterclockwise about a vertical axis A a positive angle $\alpha$ with respect to a line B horizontally perpendicular to the path of object 50. By way of example only, angle $\alpha$ may be 40°. A second pair of light beam emitters 314 and 316 is oriented to emit mutually orthogonal light beams 318 and 320 across the path of object 50 to be respectively received by receivers 322 and 324. The second pair of light beam emitters 314 and 316 (and pair of associated receivers 322 and 324) is rotated counterclockwise about vertical axis A some positive angle $\delta_1$, for example 10°, with respect to the first emitter pair 302 and 304. A third pair of light beam emitters 326 and 328 is oriented to emit mutually orthogonal light beams 330 and 332 to be respectively received by receivers 334 and 336. The third pair of light beam emitters 326 and 328 (and pair of associated receivers 334 and 336) is also rotated counterclockwise about vertical axis A a positive angle $\delta_2$ different from $\delta_1$ with respect to the first emitter pair 302 and 304. It is preferable that all of the light beam emitters be aimed so that the beams intersect vertical axis A, located in the middle of conveyor 100, to minimize the length of embodiment 300. As shown in FIG. 6, $\delta_2$ is preferably smaller than $\delta_1$ to minimize the length of apparatus 300, but this is not required. As illustrated, $\delta_2$ comprises an angle of 5°. In the arrangement shown in FIG. 6, all emitters aimed at a common point A and with $\delta_1$=10°, the length of apparatus 300 parallel to the path of conveyor 100 is only 20% greater than its width (substantially the width of conveyor 100). This is determined by the equation width * $\cot(45°-\delta_1/2)$=width * 1.2. Small angles of rotation $\delta$ between the first and second and first and third pairs of beams and a small rotational spread ($\delta_1-\delta_2$) are employed to minimize the length of the apparatus along the conveyor. It is believed that larger angles $\delta$ and greater rotational spread ($\delta_1-\delta_2$) of the beam pairs may decrease any numerical error in the computations required to compute the dimensions of object 50. However, larger rotational angles and greater rotational spread extends the length of the apparatus along the conveyor and thus undesirably reduces throughput for a given conveyor speed by requiring larger intervals between objects 50 on the conveyor 100.

Speed of object movement is determined as for the preceding embodiment of the invention. That is, object speed may be measured directly as with light beam emitter/receiver pairs 34 and 36 and 38 and 40 (see FIG. 3 and associated description above), or the conveyor belt speed may be measured, as with a contact wheel or with a rotary encoder associated with the conveyor drive.

The first and second pairs of emitters are employed, in combination with determined object speed, to ascertain the dimensions of all non-square, rectangular-boundary objects 50. The first and third pairs of emitters are employed, again in combination with determined object speed, to determine the true dimensions of any square-boundary object 50.

The combination of the first and second pairs of emitters gives four possible diagonals for the object: $D_{13}$, $D_{14}$, $D_{23}$ and $D_{24}$. For a rectangular object, the length and width dimensions may be determined as previously described herein. For a square object, the diagonal lengths form two equal pairs, but not an equal quadruple, because the angle of separation (rotation) between the first pair and second pair of emitters, unlike that employed in the previous embodiment, is not 45°. In other words, $\|D_{13}\|=\|D_{24}\|\neq\|D_{14}\|=\|D_{23}\|$. Therefore, the "true" square could be defined by either of the above pairs of diagonals. The first and third pairs of emitters are then used to get a "second look" at the square and confirm its true dimensions. As before, the two emitter pairs give four diagonals (in this instance $D_{15}$, $D_{16}$, $D_{25}$ and $D_{26}$) in two equal pairs, but not an equal quadruple: $\|D_{15}\|=\|D_{26}\|\neq\|D_{16}\|=\|D_{25}\|$. The true square appears in diagonals, so some pair of diagonals generated by the first and second light beam emitter pairs also appears in the diagonals generated by the first and third light beam emitter pairs. The "false" pairs of diagonals in the first set of four diagonals and second set of four diagonals are never of the same length, apparently because the angle of separation (rotation) $\delta_1$ of the first and second pairs of light beam emitters is different than the angle of separation (rotation) $\delta_2$ of the first and third pairs of light beam emitters. Thus, one finds the diagonals generated from the combination of the first and second pairs of light beam emitters which are the same as diagonals generated from the combination of the first and third pairs of light beam emitters, such diagonals defining the true dimensions of the square. The sensor and processing circuitry depicted in FIG. 5 and previously described, modified by the addition of a third pair of mutually orthogonal light beam emitters 326 and 328 and associated receivers 334 and 336 and programming of computer or microcontroller 210 with calculation software 214 modified in accordance with the methodology described for use of three pairs of mutually orthogonal light beam pairs, may easily be employed to implement the invention in its currently-contemplated best mode.

It will be appreciated that the embodiment 300 of the invention, while requiring an additional pair of light beam emitters and associated receivers and some additional calculations to determine the dimensions of square objects, affords a significant advantage over the first embodiment of the invention. Specifically, and with reference to FIGS. 3 and 6, the first embodiment of the invention requires a minimum length of about 2.4 times the conveyor width. Since a first object 50 must clear the measurement field of apparatus 10 before a second object 50 enters the field for measurement, this dictates extremely large spacing between objects 50, and thus limits throughput for a given conveyor speed. In contrast, with the shorter length relative to conveyor width possible with embodiment 300 (only 1.2 times the width for an angle $\delta_1$ of 10°, assuming angle $\delta_1$ is the greater of the two angles of separation employed), objects 50 may be spaced twice as close together (i.e., one-half the mutual distance) as with embodiment 10, thus doubling throughput for a given conveyor speed. Thus, by the addition of some relatively inexpensive hardware in the form of additional emitters and receivers, the utility of the invention is noticeably enhanced in embodiment 300.

While the present invention has been disclosed in terms of illustrated embodiments, those of ordinary skill in the art will recognize that it is not so limited. Many additions, deletions and modifications to these embodiments may be effected without departing from the scope of the invention as hereinafter claimed.

What is claimed is:

1. An apparatus for measuring a length and a width of a linearly-moving cuboidal object traveling at a determinable rate along a path, comprising:

beam emitters for projecting first, second, third, fourth, fifth and sixth light beams across said path of said object so as to be interrupted by passage of said object therethrough, at least one of said first, second, third, fourth, fifth, and sixth beam emitters being oriented to project a light beam in a non-perpendicular relationship to said path of said object;

at least one timing device for determining first, second, third, fourth, fifth and sixth times during which each of said respective first, second, third, fourth, fifth and sixth light beams is interrupted by the passage of said object therethrough;

a speed sensing mechanism for determining a magnitude of said rate; and a processor for calculating said length and said width of said object using determined first, second, third, fourth, fifth and sixth times and a determined magnitude of said rate.

2. The apparatus of claim 1, wherein said at least one timing device comprises receiving devices for each of said light beams and a clock associated with said receiving devices for measuring first, second, third, fourth, fifth and sixth time intervals when said first, second, third, fourth, fifth and sixth light beams are not received by said receiving devices.

3. The apparatus of claim 1, wherein said speed sensing mechanism comprises:

first and second timing sensors longitudinally spaced along said path of said object at a predetermined distance;

a clock associated with said timing sensors;

said first timing sensor adapted to start said timing sensor clock responsive to passage of a leading edge of said object thereby, and said second timing sensor adapted to stop said clock responsive to the passage of said leading object edge thereby to establish a time interval; and a device for computing said rate magnitude from said time interval and said predetermined distance.

4. The apparatus of claim 3, wherein said timing sensors comprise light beam sensors.

5. The apparatus of claim 1, further including a sensor device for measuring a height of said object.

6. The apparatus of claim 5, wherein said sensor device comprises a vertically extending light curtain employing horizontally-oriented light beams.

7. The apparatus of claim 1, wherein said first and second beam emitters are paired to project said first and second light beams in orthogonal relative orientation, said third and fourth beam emitters are paired to project said third and fourth light beams in orthogonal relative orientation and said fifth and sixth beam emitters are paired to project said fifth and sixth light beams in orthogonal relative orientation, said third and fourth paired beam emitters being rotated a first angle about an axis vertically perpendicular to said path of said linearly-moving object with respect to said first and second paired beam emitters and said fifth and sixth beam emitters being rotated a second angle, different from the first angle, about said axis with respect to said first and second paired beam emitters.

8. The apparatus of claim 7, wherein said third and fourth paired beam emitters are rotated a first positive counterclockwise angle, and said fifth and sixth beam emitters are rotated a second positive counterclockwise angle different from said first counterclockwise angle.

9. The apparatus of claim 8, wherein said first angle is 10° and said second angle is 5°.

10. The apparatus of claim 9, wherein said first and second paired beam emitters are rotated a positive, counterclockwise angle about said axis with respect to a line horizontally perpendicular to said object path.

11. The apparatus of claim 1, wherein said first, second, third, fourth, fifth and sixth light beam emitters are placed on a same side of said path of said object.

12. The apparatus of claim 1, wherein said processor for calculating comprises a microprocessor.

13. The apparatus of claim 1, wherein said light beam emitters are oriented to emit said first, second, third, fourth, fifth and sixth light beams in one or more parallel planes parallel to a plane of movement of said object.

14. The apparatus of claim 1, wherein the first, second, third, fourth, fifth and sixth beam emitters are oriented to project said respective first, second, third, fourth, fifth and sixth light beams in mutually non-parallel orientations.

15. A method for measuring a length and a width of a linearly-moving cuboidal object traveling at a determinable rate along a path, comprising:

projecting first, second, third, fourth, fifth and sixth light beams across the path of said object, at least one of said light beams being in a non-perpendicular relationship to said path of said object so as to be interrupted by passage of said object therethrough;

determining first, second, third, fourth, fifth and sixth times during which each of said respective first, second, third, fourth, fifth and sixth light beams is interrupted by the passage of said object;

determining a magnitude of said rate; and calculating said length and said width of said object using determined first, second, third, fourth, fifth and sixth times and a determined magnitude of said rate.

16. The method of claim 15, wherein said determining said times comprises receiving each of said light beams on an opposite side of said path from which that light beam is emitted, and counting said times when each of said light beams is not received.

17. The method of claim 15, wherein said determining said magnitude of said rate comprises:

timing the passage of said object over a predetermined interval along said path; and calculating said rate magnitude from said time of passage and said interval.

18. The method of claim 15, further including measuring a height of said object.

19. The method of claim 18, wherein said measuring said height of said object comprises emitting an array of mutually parallel, horizontally oriented light beams at different heights above said path from one side thereof, receiving said mutually parallel light beams on the other side of said path, interrupting one or more of said mutually parallel light beams by passage of said object therethrough, and correlating said object height to a number of mutually parallel light beams interrupted by said passage of said object.

20. The method of claim 15, further comprising projecting said first and second light beams paired in orthogonal relative orientation, projecting said third and fourth light beams paired in orthogonal relative orientation and projecting said fifth and sixth light beams paired in orthogonal relative orientation, with said third and fourth paired light beams being rotated a first angle about an axis vertically perpendicular to said object path with respect to the first and second paired light beams and with said fifth and sixth paired light beams being rotated a second angle, different from the first angle, about said axis with respect to said first and second paired light beams.

21. The method of claim 20, wherein said third and fourth paired light beams are rotated a first positive counterclockwise angle, and said fifth and sixth paired light beams are rotated a second positive counterclockwise angle different from the first angle.

22. The method of claim 21, wherein said first angle is 10° and said second angle is 5°.

23. The method of claim 22, wherein said first and second paired light beams are rotated a positive, counterclockwise angle about said axis with respect to a line horizontally perpendicular to said object path.

24. The method of claim 15, wherein said first, second, third, fourth, fifth and sixth light beams are projected from a same side of said path of said object.

25. The method of claim 15, wherein said first, second, third, fourth, fifth and sixth light beams are projected in one or more parallel planes parallel to a plane of movement of said object.

26. The method of claim 15, wherein the first, second, third, fourth, fifth and sixth light beams are projected in mutually non-parallel orientations.

27. The method of claim 15, wherein said first, second, third, fourth, fifth and sixth light beams are each projected across said path of said linearly-moving object in non-perpendicular relationship thereto.

* * * * *